(12) United States Patent  
Chen et al.

(10) Patent No.: US 11,865,786 B2  
(45) Date of Patent: Jan. 9, 2024

(54) SUPPORT STRUCTURE, AND PRINTING METHOD AND PRINTING SYSTEM THEREFOR

(71) Applicant: ZHUHAI SAILNER 3D TECHNOLOGY CO., LTD., Guangdong (CN)

(72) Inventors: Wei Chen, Guangdong (CN); Dongqing Xiang, Guangdong (CN)

(73) Assignee: ZHUHAI SAILNER 3D TECHNOLOGY CO., LTD., Guangdong (CN)

( * ) Notice: Subject to any disclaimer, the term of this patent is extended or adjusted under 35 U.S.C. 154(b) by 1167 days.

(21) Appl. No.: 16/556,871

(22) Filed: Aug. 30, 2019

(65) Prior Publication Data

US 2019/0381739 A1   Dec. 19, 2019

Related U.S. Application Data

(63) Continuation of application No. PCT/CN2017/084565, filed on May 16, 2017.

(30) Foreign Application Priority Data

Mar. 3, 2017   (CN) .......................... 201710123566.7

(51) Int. Cl.
*B29C 64/393* (2017.01)
*B33Y 10/00* (2015.01)
(Continued)

(52) U.S. Cl.
CPC ............ *B29C 64/393* (2017.08); *B33Y 10/00* (2014.12); *B33Y 30/00* (2014.12); *B33Y 50/02* (2014.12); *B33Y 80/00* (2014.12)

(58) Field of Classification Search
CPC ..................................................... B33Y 80/00
See application file for complete search history.

(56) References Cited

U.S. PATENT DOCUMENTS 5,595,703 A   1/1997   Swaelens et al.
7,073,561 B1   7/2006   Henn
(Continued)

FOREIGN PATENT DOCUMENTS

CN   103118858 A   5/2013
CN   105401724 A   3/2016
(Continued)

OTHER PUBLICATIONS

International Search Report for International application No. PCT/CN2017/084565 dated Dec. 1, 2017.
(Continued)

*Primary Examiner* — Ian A Rummel
(74) *Attorney, Agent, or Firm* — Carlson, Gaskey & Olds, P.C.

(57) ABSTRACT

An illustrative example support structure includes a solid portion printed using a first material and a non-solid portion printed using a second material. The solid portion includes a grid structure, and both inside and outside of each grid unit of the grid structure are filled with the non-solid portion. Hardness of the first material is different from hardness of the second material. A grid density of the grid structure varies within a printing plane, and/or an area of a cross-section of a connecting edge of the grid unit varies in a direction perpendicular to the printing plane. There are differences in strength of different portions of the support structure of the present disclosure, so that an adverse effect of cracking of the support structure caused by a stress concentration phenomenon occurring when the support (Continued)

structure is subjected to a stress during or after a curing process can be effectively prevented.

18 Claims, 8 Drawing Sheets

(51) Int. Cl.
    *B33Y 30/00*      (2015.01)
    *B33Y 80/00*      (2015.01)
    *B33Y 50/02*      (2015.01)

(56) References Cited

U.S. PATENT DOCUMENTS

2015/0145169 A1    5/2015    Liu et al.
2016/0229127 A1    8/2016    Halliday et al.
2017/0050385 A1    2/2017    Hakkaku et al.

FOREIGN PATENT DOCUMENTS

| | | |
|---|---|---|
| CN | 105682899 A | 6/2016 |
| CN | 106132654 A | 11/2016 |
| CN | 106180708 A | 12/2016 |
| JP | H05-084834 A | 4/1993 |
| JP | 2003-181941 A | 7/2003 |
| JP | 2013-536774 A | 9/2013 |
| JP | 2016-037040 A | 3/2016 |
| JP | 2017-007128 A | 1/2017 |

OTHER PUBLICATIONS

Notice of Reasons for Refusal, Japanese Patent Applicant No. 2019-547693, dated Sep. 29, 2020.
First Office Action, Chinese Application No. 201710123566.7 dated May 30, 2019.

SUPPORT STRUCTURE, AND PRINTING METHOD AND PRINTING SYSTEM THEREFOR

CROSS-REFERENCE TO RELATED APPLICATIONS

This application is a continuation of International Application No. PCT/CN2017/084565, filed on May 16, 2017, which claims priority to Chinese Patent Application No. 201710123566.7, filed on Mar. 3, 2017. The disclosures of the aforementioned patent applications are hereby incorporated by reference in their entireties.

TECHNICAL FIELD

The present disclosure relates to the field of three-dimensional molding technology, and more particularly, to a support structure, and a printing method and a printing system for the support structure.

BACKGROUND

Rapid molding technology is also known as rapid prototyping technology or additive fabrication technology, and their basic principles all lie in performing slicing based on a 3D model to form a plurality of slice layers, then performing data processing, and finally processing and stacking layer-by-layer (i.e., slice layer-by-slice layer) to fabricate a 3D object.

In a process of printing a 3D object layer-by-layer using inkjet printing technology, a phenomenon, in which one layer causes a preceding layer to be overhead, occurs. Thus, in order to accurately print out the 3D object, a support structure is required to be provided during the printing process for providing support for a corresponding layer. A method for printing a support structure commonly used in the related art is to print layer-by-layer using a same support material based on data of the support structure. However, since in one aspect, the support structure needs to have sufficient hardness to be capable of supporting a part of a target object requiring to be supported, and in another aspect, the support structure needs to be flexible so that it can be easily removed from the printed target object. In view of this, it is difficult to select an appropriate support material for printing the support structure.

In order to solve the problem that it is difficult to select a material, some researchers have focused on a structural design of the support structure itself. As disclosed in the Chinese patent application CN104275798A and the US patent U.S. Pat. No. 7,364,686B2, in a part of a support structure, a solid material is used to construct a grid or a skeleton or a pillar embedded in a support material, to provide extra strength to the support structure. However, when the support structure is subjected to a stress during or after a curing process, a stress concentration phenomenon will occur, thereby making it easy for the support structure to crack.

SUMMARY

The present disclosure provides a support structure, a printing method and a printing system for the support structure, which can solve the above problems.

A first aspect of the present disclosure provides a support structure, including a solid portion printed using a first material and a non-solid portion printed using a second material, the solid portion includes a grid structure, and both inside and outside of each grid unit of the grid structure are filled with the non-solid portion; wherein a hardness of the first material is different from a hardness of the second material; a grid density of the grid structure varies within a printing plane, and/or an area of a cross-section of a connecting edge of the grid unit varies in a direction perpendicular to the printing plane.

In an example embodiment, the solid portion includes a plurality of grid layers parallel with the printing plane, and the plurality of grid layers contains the grid structure; the solid portion further includes a plurality of pillars, each of the plurality of pillars penetrates at least two adjacent layers of the plurality of grid layers, and both inside and outside of space enclosed by the plurality of pillars and the plurality of grid layers are filled with the non-solid portion.

In an example embodiment, each of the plurality of grid layers divides one of the plurality of pillars into a plurality of sub-segments, and two ends of each of the plurality of sub-segments are respectively connected at vertices of grid units located in adjacent grid layers of the plurality of grid layers.

In an example embodiment, a pillar density of the plurality of pillars in the printing plane varies and/or an area of a cross-section of one of the plurality of pillars varies in the direction perpendicular to the printing plane.

In an example embodiment, both the grid density and the pillar density vary in the printing plane, and variation trends thereof are consistent and/or both the area of the cross-section of the connecting edge of the grid unit and the area of the cross-section of one of the plurality of pillars vary in the direction perpendicular to the printing plane, and a variation trend of the area of the cross-section of the connecting edge is determined by a variation trend of the area of the cross-section of one of the plurality of pillars.

In an example embodiment, a variation in the area of the cross-section of one of the plurality of pillars is achieved by a variation in a first dimension of the pillar at least in a first direction and a variation in a second dimension of the pillar at least in a second direction; the first dimension refers to a dimension of the pillar in the first direction, the second dimension refers to a dimension of the pillar in the second direction, and the first direction and the second direction respectively refer to two directions adjacent to and perpendicular to each other in the printing plane.

In an example embodiment, a variation in the area of the cross-section of one of the plurality of pillars is achieved by variations of the first dimension simultaneously in the first direction and in a direction opposite to the first direction and variations of the second dimension simultaneously in the second direction and in a direction opposite to the second direction.

In an example embodiment, the variation trend of the pillar density in one direction in the printing plane is one or a combination of several of following manners: decreasing first and then increasing and then decreasing; increasing first and then decreasing and then increasing; increasing first and then decreasing; and decreasing first and then increasing.

In an example embodiment, the variation trend of the area of the cross-section of the connecting edge of the grid unit in the direction perpendicular to the printing plane is one or a combination of several of following manners: decreasing first and then increasing and then decreasing; increasing first and then decreasing and then increasing; increasing first and then decreasing; and decreasing first and then increasing.

In an example embodiment, the hardness of the first material is greater than the hardness of the second material.

A second aspect of the present disclosure provides a printing method of a support structure for printing any of the support structure describe above, wherein the printing method includes: in a same slice layer, according to support structure layer printing data, a first step of printing and forming a layer solid portion using a first material, and printing and forming a layer non-solid portion using a second material; and repeating the first step, printing a plurality of layer solid portions and a plurality of layer non-solid portions, the plurality of layer solid portions forming a solid portion of the support structure, and the plurality of layer non-solid portions forming a non-solid portion of the support structure; wherein a hardness of the first material is different from a hardness of the second material; the solid portion comprises a grid structure, and both inside and outside of each grid unit of the grid structure are filled with the non-solid portion; a grid density of the grid structure varies within a printing plane, and/or an area of a cross-section of a connecting edge of the grid unit varies in a direction perpendicular to the printing plane.

In an example embodiment, the solid portion comprises a plurality of grid layers parallel with the printing plane, and the plurality of grid layers contain the grid structure; the solid portion further comprises a plurality of pillars, each of the plurality of pillars penetrates at least two adjacent layers of the plurality of grid layers, and both inside and outside of space enclosed by the plurality of pillars and the plurality of grid layers are filled with the non-solid portion.

In an example embodiment, the printing method further includes, prior to the first step: converting support structure region data into the support structure layer printing data.

In an example embodiment, the support structure layer printing data comprises layer solid data for printing the layer solid portion and layer non-solid data for printing the layer non-solid portion; said printing and forming the layer solid portion using the first material and printing and forming the layer non-solid portion using the second material according to the support structure layer printing data comprises: printing and forming the layer solid portion using the first material according to the layer solid data; printing and forming the layer non-solid portion using the second material according to the layer non-solid data.

In an example embodiment, the hardness of the first material is greater than the hardness of the second material.

A third aspect of the present disclosure provides a printing system for printing any of the support structure described above, wherein the printing system includes: a print head configured to print a layer solid portion using a first material and print a layer non-solid portion using a second material according to support structure layer printing data in a same slice layer, and configured to print a plurality of layer solid portions and a plurality of layer non-solid portions in such a manner that the plurality of layer solid portions forms a solid portion of the support structure and the plurality of layer non-solid portions forms a non-solid portion of the support structure; wherein a hardness of the first material is different from a hardness of the second material; the solid portion comprises a grid structure, and both inside and outside of each grid unit of the grid structure are filled with the non-solid portion; a grid density of the grid structure varies within a printing plane, and/or an area of a cross-section of a connecting edge of the grid unit varies in a direction perpendicular to the printing plane; a controller configured to control the print head to perform a printing operation; the print head is connected to the controller.

In an example embodiment, the solid portion comprises a plurality of grid layers parallel with the printing plane, and the plurality of grid layers contain the grid structure; the solid portion further comprises a plurality of pillars, each of the plurality of pillars penetrates at least two adjacent layers of the plurality of grid layers, and both inside and outside of space enclosed by the plurality of pillars and the plurality of grid layers are filled with the non-solid portion.

In an example embodiment, the printing system further includes a data processor configured to convert support structure region data into the support structure layer printing data, and the data processor is connected to the controller.

In an example embodiment, the support structure layer printing data comprises layer solid data for printing the layer solid portion and layer non-solid data for printing the layer non-solid portion.

In an example embodiment, the hardness of the first material is greater than the hardness of the second material.

The technical solution provided by the present disclosure can achieve the following beneficial effects.

With the support structure provided by the present disclosure, by configuring the grid structure in the solid portion, filling the inside and the outside of the grid unit with the non-solid material, having the grid density of the grid structure varied within the printing plane and having the area of the cross-section of the connecting edge of the grid unit varied in the direction perpendicular to the printing plane, a variation in the grid density and a variation in the area of the cross-section of the connecting edge cause strength of different portions of the support structure to be different. Generally, the larger the grid density, the larger the area of the cross-section of the connecting edge and the higher the strength of this portion of the support structure, thereby effectively preventing an adverse effect of cracking of the support structure caused by a stress concentration phenomenon occurring when the support structure is subjected to a stress during or after a curing process. Moreover, since the non-solid portion having a different hardness is used for portions of the support structure apart from the grid structure, separation of the support structure is facilitated.

The above general description and the following detailed description are merely exemplary and are not intended to limit the present disclosure.

Figure 1:
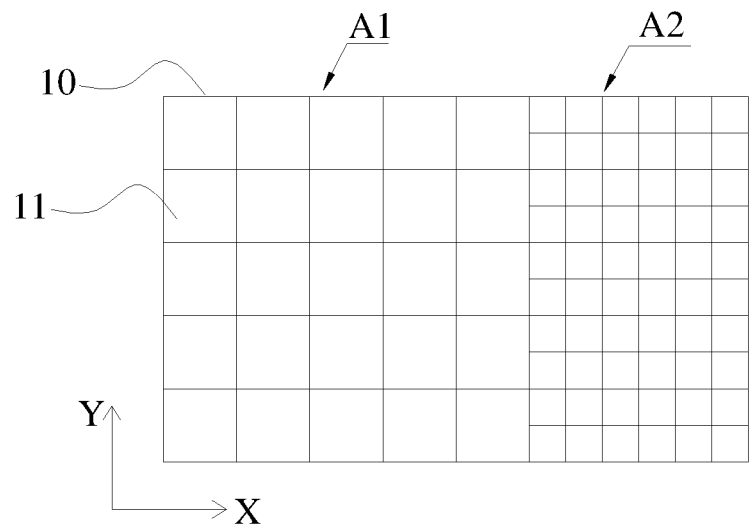
FIG. 1 is a structural schematic diagram of a slice layer according to a first embodiment of a support structure provided by the present disclosure.

The drawings include the following Reference Numerals:
10, 20—grid structure;
11, 21, 28—non-solid portion;
12—first connecting edge;
13—second connecting edge;
14—third connecting edge;
15—fourth connecting edge;
16—eighth connecting edge;
17—seventh connecting edge;
18—sixth connecting edge;
19—fifth connecting edge;
22—first portion;
23—second portion;
24—third portion;
25—fourth portion;
26—fifth portion;
27—pillar;
32—tenth portion;
33—ninth portion;
34—eighth portion;
35—seventh portion;
36—sixth portion;
A1—first region;
A2—second region;
B1—fourth region;
B2—fifth region;
B3—sixth region;
B4—seventh region;
B5—eighth region;
B6—ninth region;
51—data processor;
52—controller;
53—material storage;
54—print head;
55—levelling device;
56—radiation device;
57—guiding rail;
58—support platform; and
59—lifting mechanism.

The drawings herein are incorporated into the specification and constitute a part of this specification, showing embodiments consistent with the present disclosure and explaining the principle of the present disclosure together with the specification.

DESCRIPTION OF EMBODIMENTS

The present disclosure will be further described in detail below through specific embodiments and with reference to the accompanying drawings, in which an X-Y-Z three-dimensional coordinate system is formed in space. An X-Y plane is a printing plane, and the printing plane refers to a region swept by a print head when printing a slice layer. An X direction is a printing direction. A Y direction is perpendicular to the X direction, and a Z direction is a third direction formed by a Cartesian coordinate system.

An embodiment of the present disclosure provides a support structure that can be used for printing a 3D object layer-by-layer using inkjet printing technique. In a process of printing a 3D object, it is required to provide a support structure in order to provide support for a corresponding layer in a solid structure.

In the present disclosure, hardness of a first material is different from hardness of the second material. For example, the hardness of the first material is greater than the hardness of the second material, or the hardness of the first material is smaller than the hardness of the second material. In the embodiment of the present disclosure, a case in which the hardness of the first material is greater than the hardness of the second material is taken as an example for explanation.

First Embodiment

As shown in FIGS. 1-3*d*, a support structure includes a solid portion printed using a first material and a non-solid portion 11 printed using a second material. The solid portion includes a grid structure 10. Both inside and outside of each grid unit of the grid structure 10 are filled with the non-solid portion 11. Namely, the grid structure 10 includes a plurality of grid units. Generally, each grid unit is formed by several connecting edges that are connected end to end. As shown in FIG. 1, each grid unit is formed by four connecting edges that are connected end to end, in which two opposite connecting edges are parallel with the X direction while the other two connecting sides are parallel with the Y direction. Both the outside (not shown in FIG. 1) of each grid unit and the inside of each grid unit are filled with the non-solid portion 11, and the hardness of the first material is greater than the hardness of the second material.

Specifically, the grid structure 10 may be in a grid shape in the printing plane and may also be in a grid shape on an X-Z plane or on a Y-Z plane. Without doubt, the grid structure 10 may also be in a grid shape on other cross-sections of the support structure. Whichever way the grid structure 10 adopts, a grid density of the grid structure 10 varies within the printing plane (i.e., the X-Y plane), and an area of a cross-section of the connecting edge of the grid unit also varies in a direction (i.e., the Z direction) perpendicular to the printing plane. Without doubt, it is also possible that only the grid density varies within the printing plane, or only the area of the cross-section of the connecting edge varies in the direction perpendicular to the printing plane.

By configuring the grid structure 10 in the solid portion, filling the outside and the inside of the grid unit with a non-solid material, having the grid density of the grid structure 10 varied within the printing plane and having the area of the cross-section of the connecting edge of the grid unit varied in the direction perpendicular to the printing plane, a variation in the grid density and a variation in the area of the cross-section of the connecting edge cause strength of different portions of the support structure to be different. Generally, the larger the grid density, the larger the area of the cross-section of the connecting edge and the higher the strength of this portion of the support structure, thereby effectively preventing an adverse effect of cracking of the support structure caused by a stress concentration phenomenon occurring when the support structure is subjected to a stress during or after a curing process. Moreover, since the non-solid portion having a relatively small hardness is used for portions of the support structure apart from the grid structure, separation of the support structure is facilitated.

It should be noted that the variation in the grid density along a density direction may be one or a combination of several of following manners: decreasing first and then increasing and then decreasing; increasing first and then decreasing and then increasing; increasing first and then decreasing; and decreasing first and then increasing. Here, the density direction may be the X direction, the Y direction, a direction at an arbitrary angle with the X direction, or a direction formed by a curve in the printing plane. Without doubt, the variation in the grid density in the printing plane can also be irregular. Generally, the grid density in a region where it is easy for the support structure to crack is larger than that in other regions.

For example, as shown in FIG. 1, it is a planar structural schematic diagram of a portion of a slice layer of a support structure in the X-Y plane. The grid structure 10 includes a first region A1 and a second region A2, and grid densities of the first region A1 and the second region A2 are not equal. Obviously, a grid density of the first region A1 is smaller than a grid density of the second region A2. In the X direction, the grid densities of the first region A1 and the second region A2 varies in a manner of increasing.

A variation trend of the area of the cross-section of the connecting edge of the grid unit in the direction perpendicular to the printing plane is one or a combination of several of the following manners: decreasing first and then increasing and then decreasing; increasing first and then decreasing and then increasing; increasing first and then decreasing; and decreasing first and then increasing. Typically, the solid portion includes a plurality of grid layers parallel with the printing plane, and each grid layer has the grid structure 10 described above. At this time, a variation of the respective grid layers can be a layer-by-layer variation, i.e., areas of cross-sections of connecting edges of grid units of every two adjacent grid layers are different. It is also possible that the variation of the respective grid layers is not a layer-by-layer variation or is an irregular variation. For example, only an area of a cross-section of a connecting edge of a grid unit of every second grid layer varies. As another example, areas of cross-sections of connecting edges of grid units of the respective grid layers vary as follows: areas of cross-sections of connecting edges of grid units of first two grid layers are the same but different from those of next three grid layers (i.e., the third to fifth grid layers) that are the same, areas of cross-sections of connecting edges of grid units of the sixth and seventh are the same but different from those of the third to fifth grid layers, areas of cross-sections of connecting edges of grid units of the eighth to tenth grid layers are the same but different from those of the sixth and seventh, and so on. The various variations above for the connecting edge can be achieved by a variation in a third dimension of the connecting edge in a third direction, or by a variation in the third dimension simultaneously in the third direction and in a direction opposite to the third direction. Here, the third direction refers to a direction of the connecting edge in the printing plane, and the third dimension is a dimension of the connecting edge in the third direction.

Figure 2:
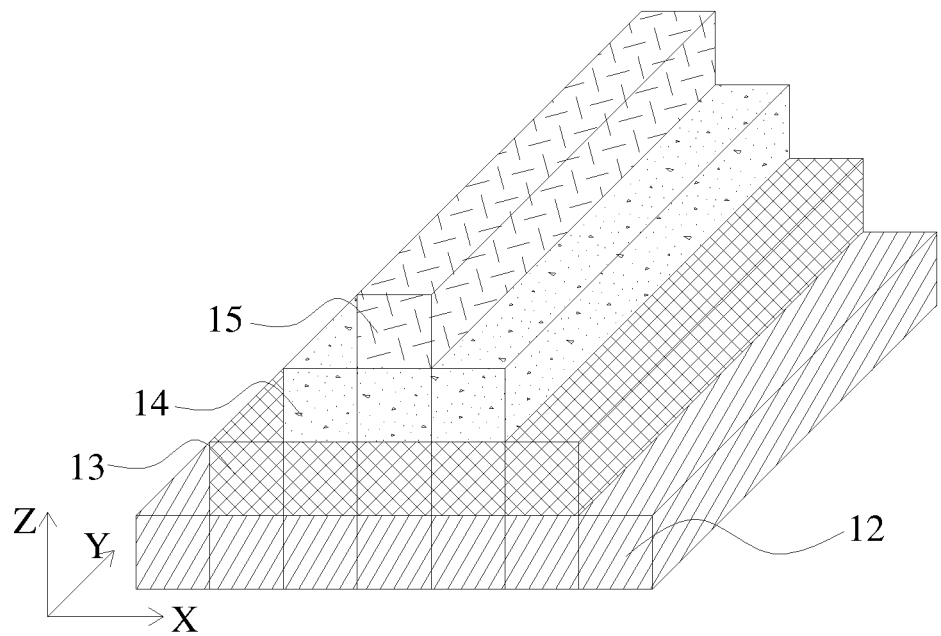
FIG. 2 is a structural schematic diagram of connecting edges in a Z direction in a first embodiment of a support structure provided by the present disclosure.
Figure 3A:
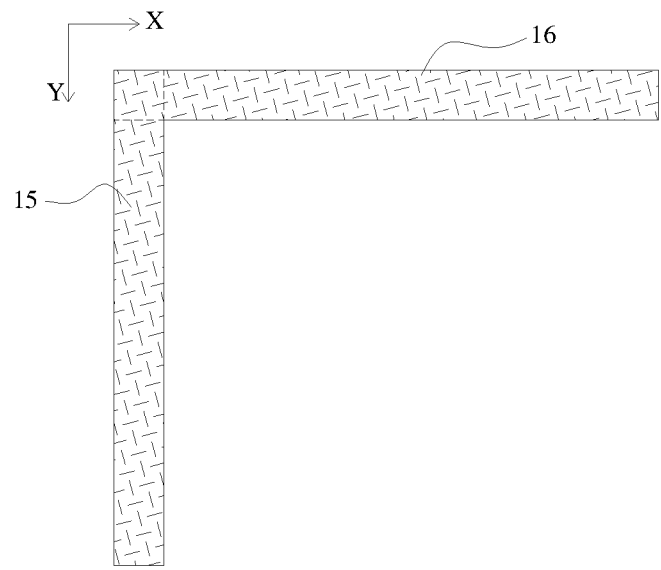
FIGS. 3a-3d are cutaway diagrams of several connecting edges shown in FIG. 2.
Figure 3B:
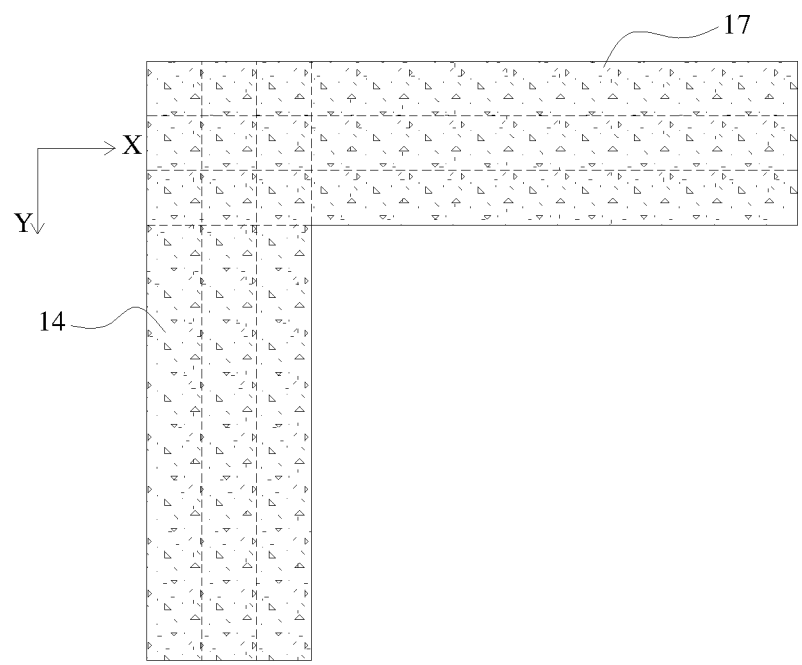
Figure 3C:
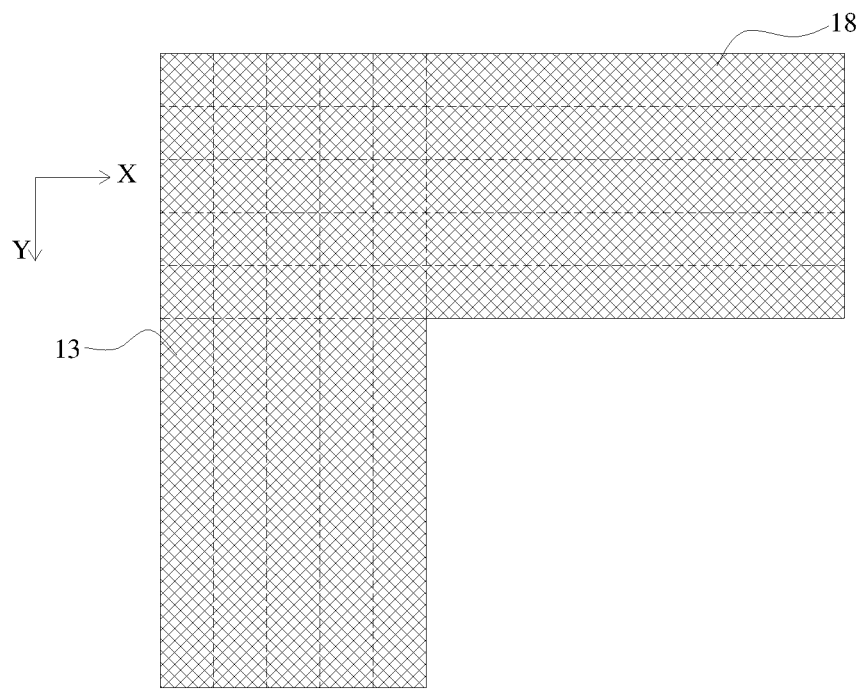
Figure 3D:
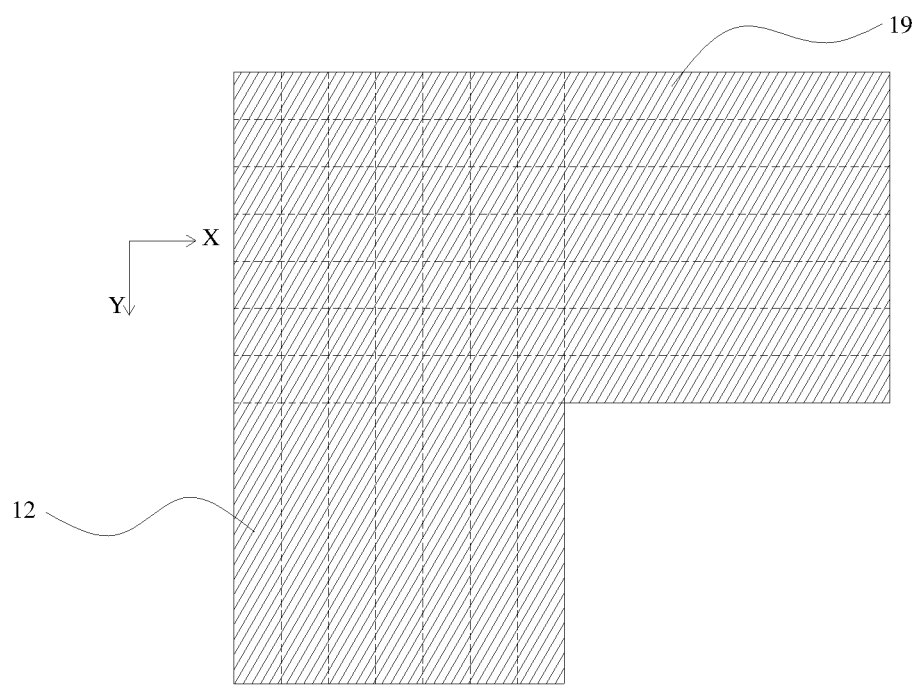

For example, as shown in FIG. 2, it is a perspective diagram of a partial cutaway of the support structure in the Z direction. The four connecting edges adjacent in the Z direction are a first connecting edge 12, a second connecting edge 13, a third connecting edge 14, and a fourth connecting edge 15. These four connecting edges are different connecting edges of the support structure printed at different positions in the Z direction using a solid material, and it can be regarded as that the first connecting edge 12, the second connecting edge 13, the third connecting edge 14 and the fourth connecting edge 15 are located in four grid layers, respectively. The third dimension of each of the connecting edges described above may be defined as a dimension in the X direction. Obviously, the third dimension of each of the connecting edges described above decreases in the Z direction as shown in FIG. 2, and a decreasing manner is achieved by simultaneously decreasing the third dimension of the connecting edge in the X direction and in a direction opposite to the X direction. In each grid layer, variations of third dimensions of two adjacent connecting edges in one grid unit may be the same or different. As shown in FIGS. 3a-3d, variations of third dimensions of a fifth connecting edge 19 adjacent to the first connecting edge 12, a sixth connecting edge 18 adjacent to the second connecting edge 13, a seventh connecting edge 17 adjacent to the third connecting edge 14 and an eighth connecting edge 16 adjacent to the fourth connecting edge 15 are the same as the variation in their adjacent connecting edges. Only for the fifth connecting edge 19, the sixth connecting edge 18, the seventh connecting edge 17 and the eighth connecting edge 16, the third direction is the Y direction shown in the drawing. Specifically, as shown in FIG. 3a, each of the third dimension of the fourth connecting edge 15 and the third dimension of the eighth connecting edge 16 is a dimension of one pixel. As shown in FIG. 3b, based on the fourth connecting edge 15, the third connecting edge 14 is added by one pixel both in the X direction and in the direction opposite to the X direction, respectively, such that the third dimension of the third connecting edge 14 is three times the third dimension of the fourth connecting edge 15; and based on the eighth connecting edge 16, the third dimension of the seventh connecting edge 17 is added by one pixel both in the Y direction and in a direction opposite to the Y direction, respectively, such that the third dimension of the seventh connecting edge 17 is three times the third dimension of the eighth connecting edge 16. As shown in FIG. 3c, based on the third connecting edge 14, the second connecting edge 13 is added by one pixel both in the X direction and in the direction opposite to the X direction, respectively, such that the third dimension of the second connecting edge 13 is five times the third dimension of the fourth connecting edge 15; and based on the seventh connecting edge 17, the third dimension of the sixth connecting edge 18 is added by one pixel both in the Y direction and in the direction opposite to the Y direction, respectively, such that the third dimension of the sixth connecting edge 18 is five times the third dimension of the eighth connecting edge 16. As shown in FIG. 3d, based on the second connecting edge 13, the first connecting edge 12 is added by one pixel both in the X direction and in the direction opposite to the X direction, respectively, such that the third dimension of the first connecting edge 12 seven times that of the fourth connecting edge 15; and based on the sixth connecting edge 18, the third dimension of the fifth connecting edge 19 is added by one pixel both in the Y direction and in the direction opposite to the Y direction, respectively, such that the third dimension of the fifth connecting edge 19 is seven times the third dimension of the eighth connecting edge 16. In the above FIG. 2 to FIG. 3d, each square in the drawing represents one pixel. Moreover, in the present disclosure, a position corresponding to one grid layer in the Z direction is regarded as one position, and different grid layers correspond to different positions in the Z direction. Without doubt, an area of a cross-section of each connecting edge in each grid layer is determined according to actual needs and may be one or more pixels, which is determined according to actual needs, and the first embodiment is only one case.

It should be noted that the variation in the grid density and the variation in the area of the cross-section of the connecting edge are independent of each other, and through the combination of the various variations above, it is possible to better adapt to a specific structure of the support structure, so that the support structure has sufficient supporting force and can be easily separated from the solid structure.

Second Embodiment

The solid portion in the first embodiment described above includes a plurality of grid layers parallel with the printing plane and the grid layer has a grid structure. The second embodiment differs from the first embodiment in that, as shown in FIGS. 4a-6c, the solid portion may further include a plurality of pillars 27, and each pillar 27 penetrates at least two adjacent grid layers. Both inside and outside of space enclosed by the pillars 27 and the grid layers are filled with a non-solid portion 28. Namely, in the support structure, except for the grid structure 20 and the pillars 27, remaining portions are all filled with the non-solid portion 28. By additionally providing the pillars 27 to the solid portion, the strength of the support structure can be further increased, thereby ensuring the support strength of the support structure. The pillars 27 may be disposed in the direction perpendicular to the printing plane or may be disposed at a non-zero angle relative to the printing plane.

Specifically, a single grid layer or multiple grid layers may be disposed between two adjacent pillars 27. Each pillar 27 can be provided by penetrating connecting edges of grid units in different layers or penetrating out through the grid units in different layers. Optionally, the respective grid layers divide the pillar 27 into a plurality of sub-segments. Two ends of each sub-segment are respectively connected at vertices of the grid units located in adjacent grid layers (the vertex is an intersection of two adjacent connecting edges of the grid unit), especially when the pillar 27 is arranged in the direction perpendicular to the printing plane (i.e., the pillar 27 extends in the Z direction), thereby making it possible to be combined with the grid structure to increase the strength of the grid structure and thus further increase the strength of the support structure. It can be understood that areas of cross-sections of respective sub-segments may be equal or unequal. Here, the cross-section refers to a section perpendicular to an extending direction of the pillar 27.

Further, a pillar density of the pillar 27 in the printing plane can be consistent, and there may also be a variation, such as a variation in the pillar density in the X direction and/or in the Y direction, or there may also be a variation in a direction at any angle relative to the X direction, or the pillar density can vary in a direction formed by a curve in the X-Y plane. Specifically, a variation trend of the pillar density in one direction in the printing plane may be one or a combination of several of following manners: decreasing first and then increasing and then decreasing; increasing first and then decreasing and then increasing; increasing first and then decreasing; and decreasing first and then increasing.

An area of a cross-section of the pillar 27 may be constant or may vary in the direction perpendicular to the printing plane. A variation in the area of the cross-section of the pillar 27 can be a layer-by-layer variation, and it is also possible to vary every several layers, or there may be a variation in a portion between two adjacent grid layers. Specifically, a variation trend of the area of the cross-section of the pillar 27 in the direction perpendicular to the printing plane may be one or a combination of several of following manners: decreasing first and then increasing and then decreasing; increasing first and then decreasing and then increasing; increasing first and then decreasing; and decreasing first and then increasing.

Optionally, the pillar density of the pillar 27 varies in the printing plane; and the area of the cross-section of the pillar 27 varies in the direction perpendicular to the printing plane. For example, at a position where crack easily occurs, the pillar density is relatively large and the area of the cross-section is relatively large, such that cracking of the support structure can be better prevented. Without doubt, it is also possible that only the pillar density varies within the printing plane, or only the area of the cross-section of the pillar varies in the direction perpendicular to the printing plane. Here, the variation in the pillar density and the variation in the area of the cross-section of the pillar 27 are independent of each other.

Figure 4A:
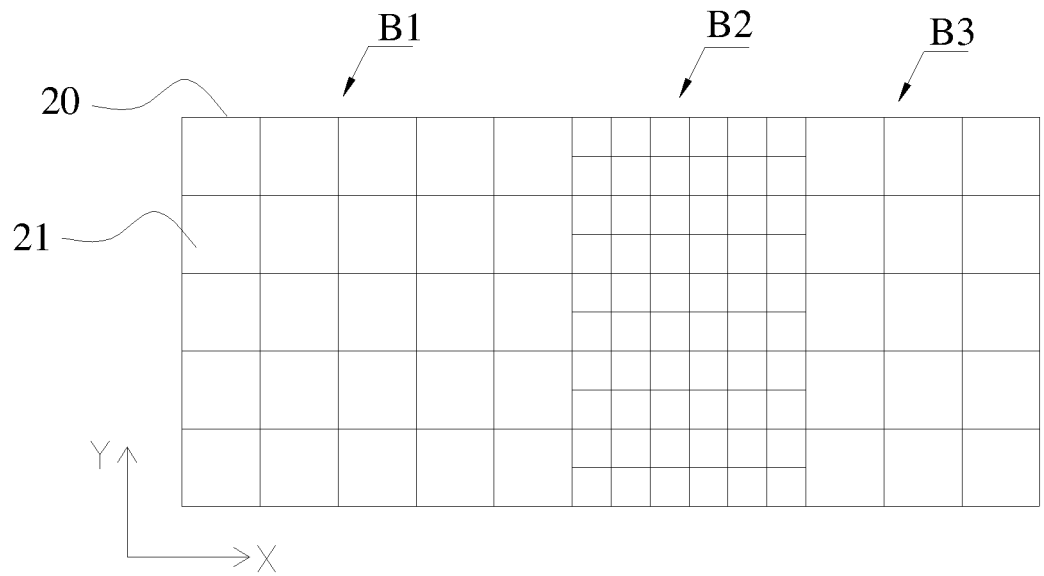
FIGS. 4a-4b are structural schematic diagrams of an adjacent slice layer of a second embodiment of a support structure provided by the present disclosure.
Figure 4B:
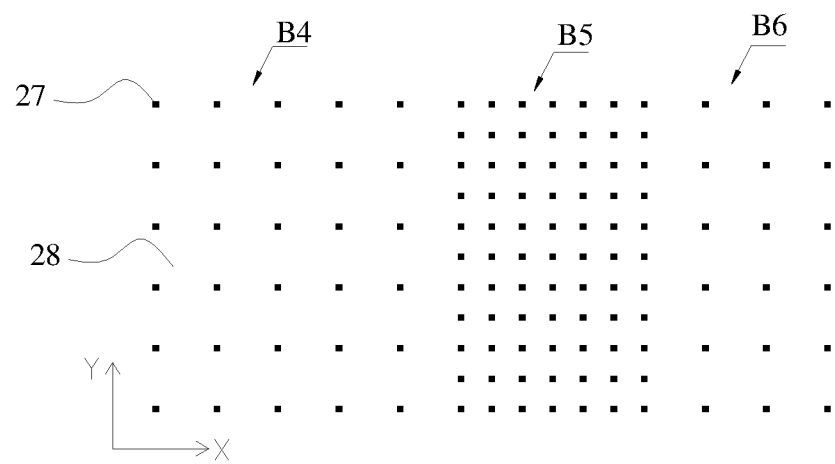

When both the grid density and the pillar density vary in the printing plane, the variation trends of the grid density and the pillar density can be consistent in the printing plane. FIG. 4a and FIG. 4b respectively show a partial planar structural schematic diagram of a slice layer at the grid structure of the support structure of a 3D object in the X-Y plane and a partial planar structural schematic diagram of a slice layer at the pillar 27 adjacent thereto in the XY plane. In FIG. 4a, both the inside and the outside (not shown in FIG. 4a) of each grid unit of the grid structure 20 are filled with the non-solid portion 21, and the slice layer includes, in the X direction, a fourth region B1, a fifth region B2 and a sixth region B3. Grid densities of the fourth region B1, the fifth region B2 and the sixth region B3 increase first and then decrease in the X direction. Namely, the fifth region B2 has a larger grid density than the fourth region B1, and the sixth region B3 has a smaller grid density than the fifth region B2. In FIG. 4b, space enclosed by the respective pillars 27 and the grid structure is filled with a non-solid portion 28, and the slice layer includes, in the X direction, a seventh region B4, an eighth region B5 and a ninth region B6. The pillar densities of the pillar 27 in these three regions are inconsistent and increase first and then decrease in the X direction. Namely, the eighth region B5 has a larger pillar density than the seventh region B4, and the ninth region B6 has a smaller pillar density than the eighth region B5. Obviously, the variation trend of the grid density of the slice layer in FIG. 4a is consistent with the variation trend of the pillar density of the slice layer in FIG. 4b.

When both the area of the cross-section of the connecting edge of the grid unit and the area of the cross-section of the pillar 27 vary in the direction perpendicular to the printing plane, the variation trend of the area of the cross-section of the connecting edge is determined by the variation trend of the area of the cross-section of the pillar 27, especially when two ends of each sub-segment are respectively connected at vertices of the grid units located in adjacent grid layers. When the area of the cross-section of the pillar 27 at a certain grid unit is relatively large, the area of the cross-section of the connecting edge of this grid unit is also relatively large. Optionally, the area of the cross-section of the connecting edge of this grid unit at this point is equal to the area of the cross-section of the pillar 27 there, so as to increase connection strength between the pillar 27 and the grid structure 20.

The variation in the area of the cross-section of the pillar 27 can be achieved only by a variation in a first dimension in a first direction, or only by a variation in a second dimension in a second direction; it can also be achieved only by variations of the first dimension in the first direction and in a direction opposite to the first direction, or only by variations of the second dimension in the second direction and in a direction opposite to the second direction. Optionally, the variation in the area of the cross-section of the pillar 27 can be achieved by the variation in the first dimension of the pillar 27 at least in the first direction and the variation in the second dimension at least in the second direction, and it specifically includes several manners as below.

A First Manner

Figure 5:
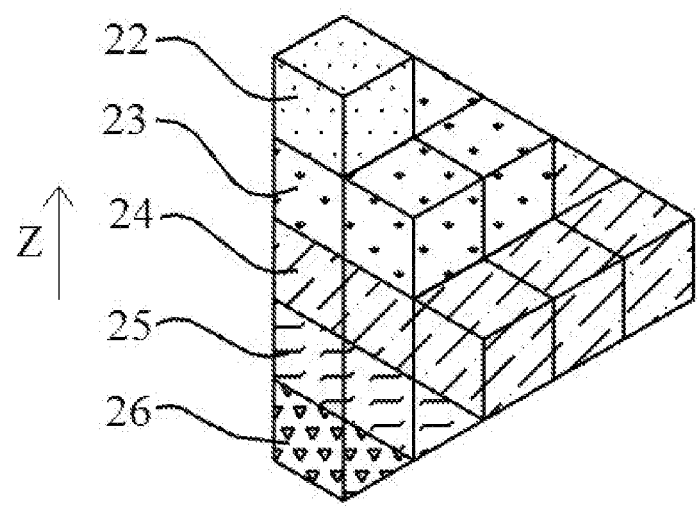
FIG. 5 is a schematic diagram showing one structure of a pillar of a second embodiment of a support structure provided by the present disclosure.
Figure 6A:
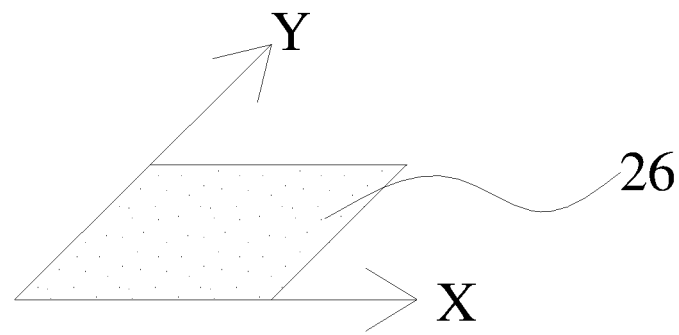
FIGS. 6a-6c are structural diagrams of cross-sections of several portions in the pillar shown in FIG. 5.
Figure 6B:
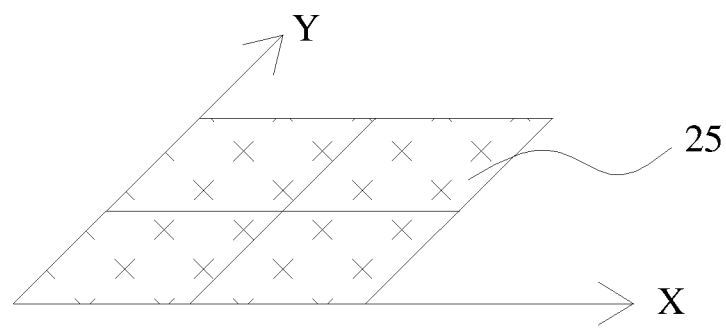
Figure 6C:
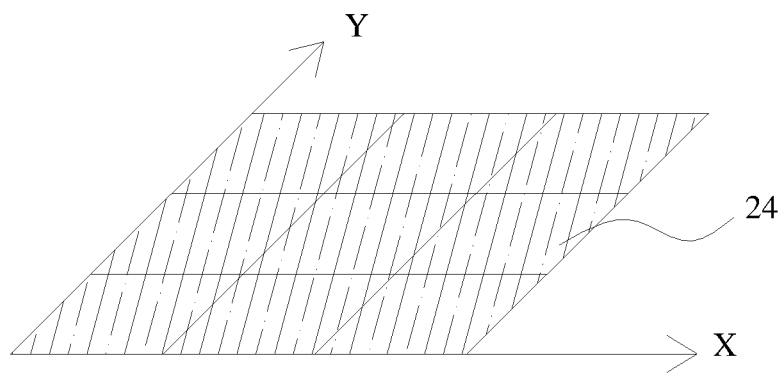

The variation in the area of the cross-section of the pillar 27 can be achieved by the variation in the first dimension of the pillar 27 only in the first direction and the variation in the second dimension only in the second direction. As shown in FIG. 5, it is a structural diagram of a pillar in a direction (i.e., the Z direction) perpendicular to the printing plane. It is divided into five portions according to its different positions in the Z direction, which are a first portion 22, a second portion 23, a third portion 24, a fourth portion 25 and a fifth portion 26, respectively. Variation trends of areas of cross-sections of these five portions in the Z direction are all: increasing first and then decreasing. These five portions can be understood as a plurality of sub-segments divided by a plurality of grid layers. FIGS. 6a-6c show structural diagrams of cross-sections of several ones of these portions. It can be understood that each square in the drawing can be regarded as one pixel, and then the fifth portion 26 has a cross-section of one pixel and both its first dimension and second dimension are dimensions of one pixel, as shown in FIG. 6a. Base on the fifth portion 26, the fourth portion 25 is added by one pixel both in the X direction and in the Y direction, such that a first dimension and a second dimension of the fourth portion 25 are both dimensions of two pixels. The fourth portion 25 has a cross-section of four pixels, and the area of the cross-section of the fourth portion 25 is four times the area of the cross-section of the fifth portion 26. As shown in FIG. 6c, based on the fifth portion 25, the third portion 24 is added by one pixel both in the X direction and in the Y direction, such that a first dimension and a second dimension of the third portion 24 are both dimensions of three pixels. The third portion 24 has a cross-section of nine pixels, and the area of the cross-section of the third portion 24 is nine times the area of the cross-section of the fifth portion 26. Subsequently, based on the third portion 24, the second portion 23 is reduced by one pixel both in the X direction and in the Y direction, such that a first dimension and a second dimension of the second portion 23 are both dimensions of two pixels. The second portion 23 is of four pixels, which is equal to the area of the cross-section of the fourth portion 25. Based on the second portion 23, the first portion 22 is reduced by one pixel both in the X direction and in the Y direction, such that a first dimension and a second dimension of the first portion 22 are both dimensions of one pixel, which is equal to the area of the cross-section of the fifth portion 26. It is apparent that the variation in the cross-sections of the respective portions of the pillar 27 in the Z direction shown in FIG. 5 is: one pixel-four pixels-nine pixels-four pixels-one pixel.

A Second Manner

Figure 7:
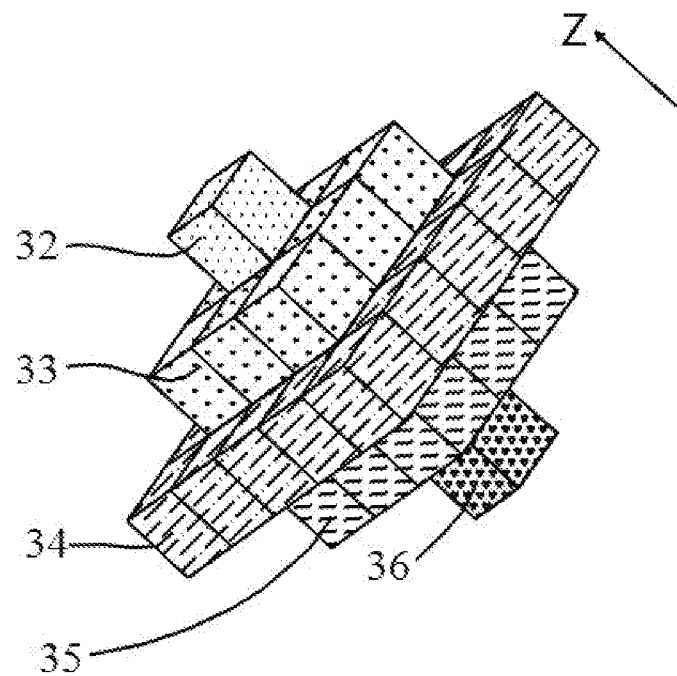
FIG. 7 is a schematic diagram showing another structure of a pillar of a second embodiment of a support structure provided by the present disclosure.
Figure 8A:
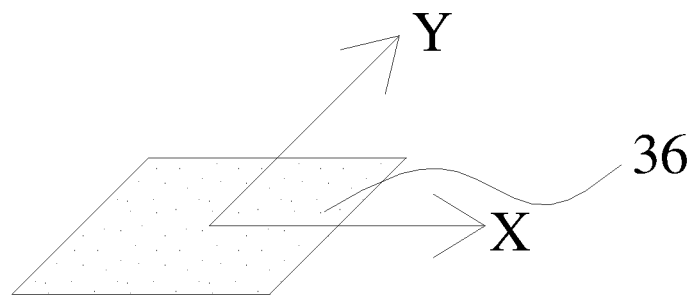
FIGS. 8a-8c are structural diagrams of cross-sections of several portions in the pillar shown in FIG. 7.
Figure 8B:
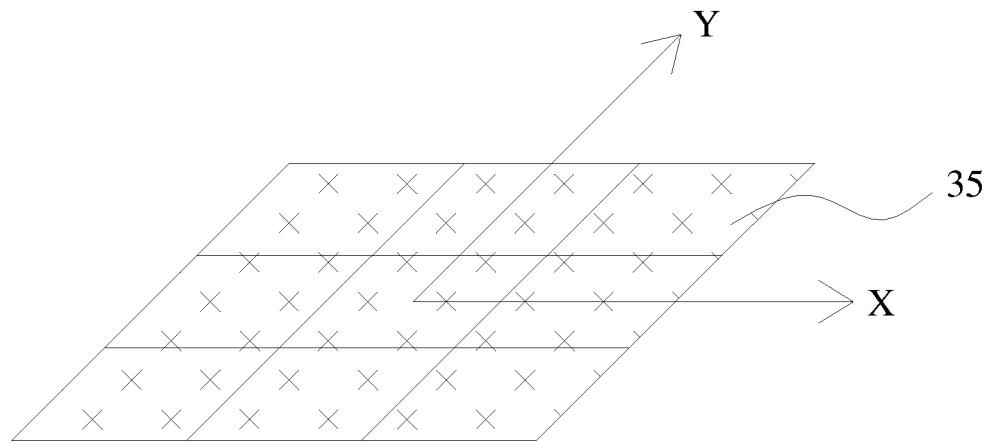
Figure 8C:
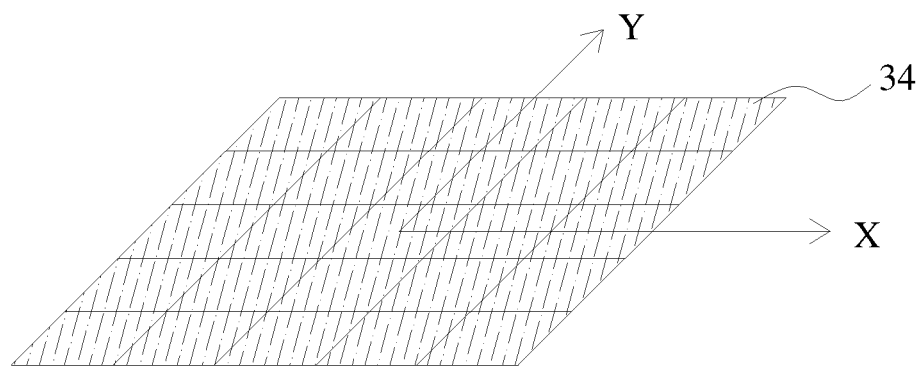

The variation of the pillar 27 can also be achieved by the variation in the first dimension simultaneously in the first direction and in the direction opposite to the first direction and the variation in the second dimension simultaneously in the second direction and in the direction opposite to the second direction. As shown in FIGS. 7-8c, FIG. 7 shows a structural diagram of a pillar in a direction (i.e., the Z direction) perpendicular to the printing plane. It is divided into five portions according to its different positions in the Z direction: a sixth portion 36, a seventh portion 35, an eighth portion 34, a ninth portion 33 and a tenth portion 32, respectively. Variation trends of areas of cross-sections of these five portions in the Z direction are: increasing first and then decreasing. These five portions can be understood as a plurality of sub-segments divided by a plurality of grid layers. FIGS. 8a-8c show structural schematic diagrams of cross-sections of several ones of these portions. It can be understood that each square in the drawing can be regarded as one pixel, and then the sixth portion 36 has a cross-section of one pixel. As shown in FIG. 8a, a first dimension and a second dimension of the sixth portion 36 are both dimensions of one pixel. As shown in FIG. 8b, with the sixth portion 36 as a center, the seventh portion 35 is add by one pixel in the X direction, in the direction opposite to the X, in the Y direction and in the direction opposite to the Y direction, respectively, such that a first dimension and a second dimension of the seventh portion 35 are both dimensions of three pixels. The seventh portion 35 has a cross-section of nine pixels, and an area of a cross-section of the seventh portion 35 is nine times the area of the cross-section of the sixth portion 36. As shown in FIG. 8c, with the seventh portion 35 as a center, the eighth portion 34 is added by one pixel in the X direction, in the direction opposite to the X, in the Y direction and in the direction opposite to the Y direction, respectively, such that the first dimension and the second dimension of the eighth portion 34 are both dimensions of five pixels. The eighth portion 34 has a cross-section of twenty-five pixels, and an area of the cross-section of the eighth portion 34 is twenty-five times the area of the cross-section of the sixth portion 36. Subsequently, based on the eighth portion 34, the ninth portion 33 is reduced by one pixel in the X direction, in the direction opposite to the X, in the Y direction and in the direction opposite to the Y direction, respectively, such that a first dimension and a second dimension of the ninth portion 33 are both dimensions of three pixels. The ninth portion 33 is of nine pixels, which is equal to the area of the cross-section of the seventh portion 35. Based on the ninth portion 33, the tenth portion 32 is reduced by one pixel in the X direction, in the direction opposite to the X, in the Y direction and in the direction opposite to the Y direction, respectively, such that a first dimension and a second dimension of the tenth portion 22 are both dimensions of one pixel, which is equal to the area of the cross-section of the sixth portion 36.

It should be noted that the first dimension refers to a dimension of the pillar 27 in the first direction, and the second dimension refers to a dimension of the pillar 27 in the second direction. The first direction and the second direction respectively refer to two directions adjacent to and perpendicular to each other in the printing plane. As shown in FIGS. 5-6c, the first direction refers to the X direction, and the second direction refers to the Y direction. The third embodiment only provides an embodiment in which one square represents one pixel, but one square can also represent a plurality of pixels, such as two, three or more, depending on actual needs.

Figure 9:
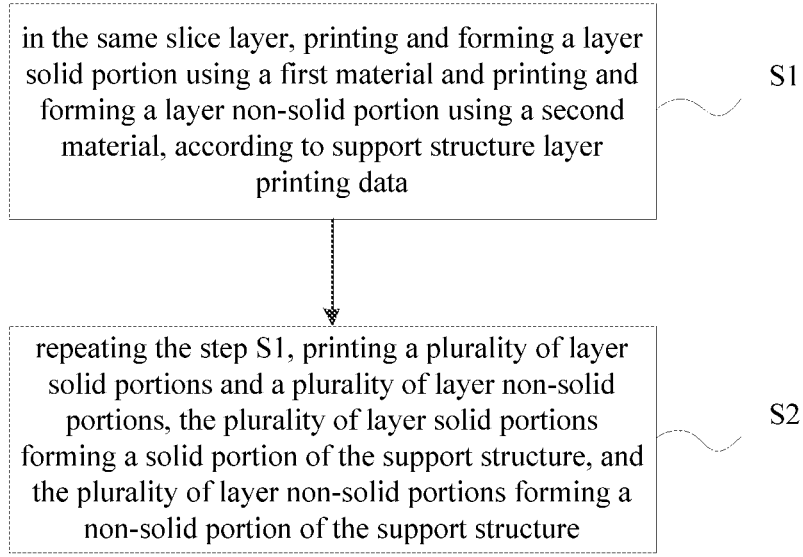
FIG. 9 is a flow chart of a printing method provided by the present disclosure.

The present disclosure also provides a printing method of a support structure, for printing the support structure as described above. As shown in FIG. 9, the printing method includes: a step S1: in the same slice layer, printing and forming a layer solid portion using a first material and printing and forming a layer non-solid portion using a second material, according to support structure layer printing data; and a step S2: repeating the step S1, printing a plurality of layer solid portions and a plurality of layer non-solid portions, the plurality of layer solid portions forming a solid portion of the support structure, and the plurality of layer non-solid portions forming a non-solid portion of the support structure.

A hardness of the first material is greater than a hardness of the second material. The solid portion includes a grid structure, and both inside and outside of each grid unit of the grid structure are filled with the non-solid portion.

A grid density of the grid structure varies within a printing plane, and/or an area of a cross-section of a connecting edge of the grid unit varies in a direction perpendicular to the printing plane, and variations of the grid density and the cross-section of the connecting edge of the grid unit above are as described in the above support structure.

Specifically, the solid portion of the support structure printed by the above method includes a plurality of grid layers parallel with the printing plane, and the grid layer has the grid structure. The solid portion further includes a plurality of pillars, and each of the pillars penetrates at least two adjacent grid layers. Both inside and outside of space enclosed by the pillars and the grid layers are filled with the non-solid portion. Specific structures of the pillar and the grid will not be described herein. For details, reference can be made to the first embodiment and the second embodiment.

Here, before the step S1, the printing method further includes a step S0: converting support structure region data into the support structure layer printing data, i.e., in a print model formed by a 3D structure, performing conversion on the support structure region data to form the support structure layer printing data to prepare for layer-by-layer printing.

Specifically, when printing the support structure, the support structure layer printing data includes layer solid data for printing the layer solid portion, and layer non-solid data for printing the layer non-solid portion. The above printing and forming the layer solid portion using the first material and printing and forming the layer non-solid portion using the second material according to the support structure layer printing data above is specifically as follows: printing and forming the layer solid portion using the first material according to the layer solid data; and printing and forming the layer non-solid portion using the second material print according to the layer non-solid data.

In the above steps, the layer solid portion and the layer non-solid portion are printed and formed by using different data respectively, such that a data processing speed in the printing process is improved.

The layer solid data can include layer grid solid data and layer pillar solid data. The layer non-solid data includes layer grid non-solid data and layer pillar non-solid data. Printing and forming the layer solid portion using the first material according to the layer solid data and printing and forming the layer non-solid portion using the second material according to the layer non-solid data is carried out in a following manner: in the same slice layer, printing and forming a grid structure using the first material according to the layer grid solid data; printing and forming a pillar using the first material according to the layer pillar solid data; printing and forming the non-solid portion inside and outside of the grid unit of the grid layer using the second material according to the layer grid non-solid data; and printing and forming the non-solid portion inside and outside of the space enclosed by the pillar and the grid layer using the second material according to the layer pillar non-solid data. Taking a case of printing the second embodiment described above as an example, in a slice layer of the support structure, a partial slice layer may exist, and only the layer grid solid data for printing the grid structure and the layer grid non-solid data for printing the non-solid portions scattered inside and outside of the grid unit are included on the same slice layer. It is also possible that a partial slice layer exists in the slice layer of the support structure, and only the layer pillar solid data for printing the pillar and the layer pillar non-solid data for printing the non-solid portions scattered inside and outside of the space enclosed by the pillar and the grid layer are included on the same slice layer.

Figure 10:
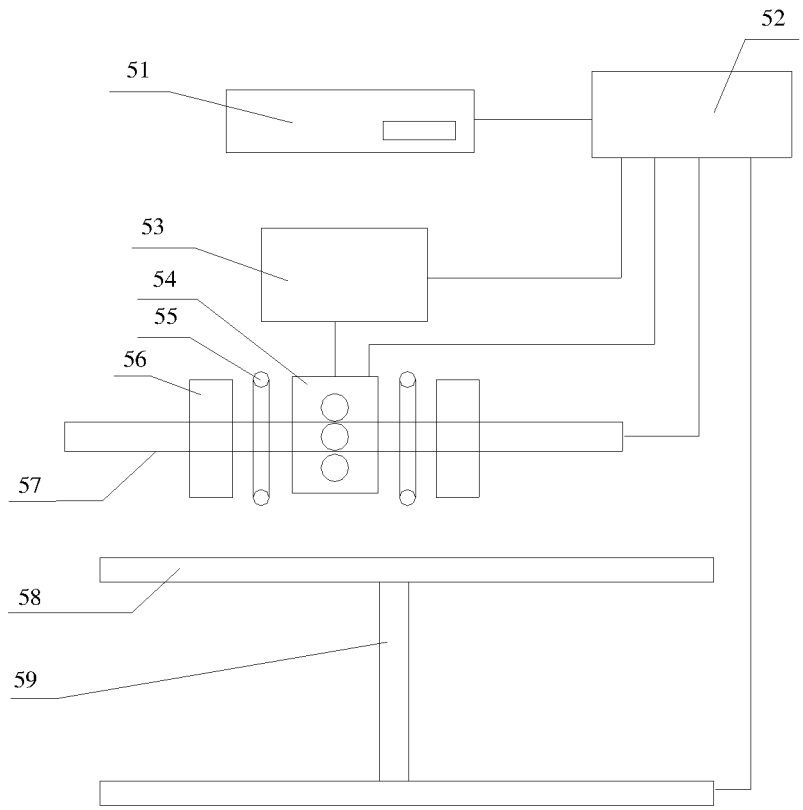
FIG. 10 is a system diagram of a printing system provided by the present disclosure.

In addition, the present disclosure also provides a printing system for printing the support structure as described in any of the above embodiments. As shown in FIG. 10, the printing system includes: a print head 54 configured to print and form a layer solid portion using a first material and print and form a layer non-solid portion using a second material, according to support structure layer printing data in the same slice layer, and to print a plurality of layer solid portions and a plurality of layer non-solid portions, in such a manner that the plurality of layer solid portions forms a solid portion of the support structure and the plurality of layer non-solid portions forms a non-solid portion of the support structure.

A hardness of the first material is greater than a hardness of the second material. The solid portion includes a grid structure, and inside and outside of each grid unit of the grid structure is filled with the non-solid portion. A grid density of the grid structure varies within a printing plane, and/or an area of a cross-section of a connecting edge of the grid unit varies in a direction perpendicular to the printing plane.

A controller 52 is configured to control the print head 54 to perform a printing operation. The print head 54 is connected to the controller 52.

Further, as described above in the support structure, the solid portion includes a plurality of grid layers parallel with the printing plane, and the grid layer has the grid structure; the solid portion further includes a plurality of pillars, and each of the pillars penetrates at least two adjacent layers of the grid layers; and inside and outside of space enclosed by the pillars and the grid layers are filled with the non-solid portion.

In addition, the printing system further includes a curing device, and the curing device is used for curing the layer solid portion and the layer non-solid portion. Typically, the curing device is mounted on both sides of the print head 54, can be connected to the controller 52, and is controlled by the controller 52.

The curing device can be a radiation device 56, such as an LED light; or it can be a temperature control device (not shown in the drawing), such as a fan, etc. It is also possible to provide the radiation device 56 and the temperature control device at the same time. Here, one or more radiation devices 56 and one or more temperature control devices can be provided, and when a plurality of radiation devices 56 and a plurality of temperature control devices are provided, the respective radiation devices 56 and the temperature control devices can work simultaneously or alternately.

The printing system further includes a material storage 53 for storing the first material and the second material. The material storage 53 is connected to the print head 54 and the controller 52, respectively. The number of the material storages 53 is determined according to actually required material types or printing demands.

In order to facilitate processing of the support structure layer printing data, the printing system further includes a data processor 51 for converting support structure region data into the support structure layer printing data, and the data processor is connected to the controller 52. Moreover, the data processor 51 is further used to acquire the support structure region data during a slicing process of a 3D object. Here, the support structure layer printing data includes layer solid data for printing the layer solid portion and layer non-solid data for printing the layer non-solid portion, and the data processor 51 is connected to the controller 52, in order to facilitate the controller 52 controlling the print head 54 to perform a printing operation based on the layer solid data and the layer non-solid data provided by the data processor 51.

Due to factors such as performance of the print head 54 itself or fluctuation of a surrounding environment during printing of a 3D object, a surface of the printed slice layer may be uneven, which may affect precision of molding. Therefore, the printing system of the present disclosure further includes a levelling device 55, which may specifically be a levelling roll, and there may be one, two or more levelling rolls provided. When two levelling rolls are provided, they are respectively located on two sides of the print head 54. The number of the specifically installed rolls is determined according to actual needs. Levelling of the slice layer printed is achieved with the levelling device 55, so that the printing precision is improved.

Further, the printing system further includes a guide rail 57, a support platform 58, and a lifting mechanism 59. The print head 54, the radiation device 56 or the temperature control device and the levelling device 55 are all slidably mounted on the guide rail 57 to enable respective devices to move synchronously. The support platform 58 is used to receive a target object to be printed. The lifting mechanism 59 is used to lower by a designated height after each one or more slice layers are printed, so as to perform printing of a next layer or next layers. The support platform 58 is connected to the lifting mechanism 59. The lifting mechanism 59 is connected to the controller 52 so as to be controlled by the controller 52.

Taking a case of printing the support structure in the first embodiment of the present disclosure as an example, there are two material storages 53, which are a first material storage and a second material storage. The controller 52 controls, according to the support structure layer printing data processed by the data processor 51, the print head 54 to print the grid structure using the first material and print the non-solid portion using the second material, and the non-solid portions are scattered around the grid structure. In the plurality of slice layers of the support structure, a grid density varies on an X-Y plane, and a cross-section of a connecting edge of the grid structure varies in a Z direction. A variation in the grid density of the grid on the X-Y plane is independent of a variation in the cross-section of the connecting edge in the Z direction. Specific variations are the same as those in the first embodiment and are not described here.

Taking a case of printing the support structure in the second embodiment of the present disclosure as an example, there are two material storages 53, which are a first material storage and a second material storage. The controller 52 controls, according to the support structure layer printing data processed by the data processor 51, the print head 54 to perform a printing operation. In a part of the support structure layer, the print head 54 uses the first material to print the grid structure and uses the second material to print the non-solid portions scattered around the grid structure; in another part of the support structure layer, the print head 54 prints the pillar using the first material and prints the non-solid portions scattered around the pillar using the second material. In a partial slice layer of the support structure, a pillar density varies in the X-Y plane, and a cross-section of the pillar varies in the Z direction. In a partial slice layer of the support structure, the grid density varies in the X-Y plane, and the connecting edge of the grid structure varies in the Z direction. Further, a density variation of the pillar in the X-Y plane is independent of a variation of the cross-section of the pillar in the Z direction, and the variation in the cross-section of the connecting edge of the grid structure in the Z direction is determined by the variation of the cross-section of the pillar in the Z direction. Specific variations are the same as those in the second embodiment and are not described here.

The above description is only the preferred embodiments of the present disclosure and is not intended to limit the present disclosure. Various changes and modifications may be made to the present disclosure by those skilled in the art. Any modifications, equivalent substitutions, improvements, etc. made within the spirit and principles of the present disclosure are intended to be included within the scope of the present disclosure.

What is claimed is:

1. A support structure, comprising a solid portion printed using a first material and a non-solid portion printed using a second material, the solid portion comprising a grid structure, both inside and outside of each grid unit of the grid structure being filled with the non-solid portion; wherein a hardness of the first material is different from a hardness of the second material;
   a grid density of the grid structure varies within a printing plane,
   and/or
   an area of a cross-section of a connecting edge of the grid unit varies in a direction perpendicular to the printing plane;
   wherein the solid portion comprises a plurality of grid layers parallel with the printing plane, and the plurality of grid layers contains the grid structure; the solid portion further comprises a plurality of pillars, each of the plurality of pillars penetrates at least two adjacent layers of the plurality of grid layers, and both inside and outside of space enclosed by the plurality of pillars and the plurality of grid layers are filled with the non-solid portion.

2. The support structure according to claim 1, wherein each of the plurality of grid layers divides one of the plurality of pillars into a plurality of sub-segments, and two ends of each of the plurality of sub-segments are respectively connected at vertices of grid units located in adjacent grid layers of the plurality of grid layers.

3. The support structure according to claim 2, wherein a pillar density of the plurality of pillars in the printing plane varies;
   and/or
   an area of a cross-section of one of the plurality of pillars varies in the direction perpendicular to the printing plane.

4. The support structure according to claim 3, wherein both the grid density and the pillar density vary in the printing plane, and variation trends thereof are consistent;
   and/or
   both the area of the cross-section of the connecting edge of the grid unit and the area of the cross-section of one of the plurality of pillars vary in the direction perpendicular to the printing plane, and a variation trend of the area of the cross-section of the connecting edge is determined by a variation trend of the area of the cross-section of one of the plurality of pillars.

5. The support structure according to claim 3, wherein a variation in the area of the cross-section of one of the plurality of pillars is achieved by a variation in a first dimension of the pillar at least in a first direction and a variation in a second dimension of the pillar at least in a second direction; the first dimension refers to a dimension of the pillar in the first direction, the second dimension refers to a dimension of the pillar in the second direction, and the first direction and the second direction respectively refer to two directions adjacent to and perpendicular to each other in the printing plane.

6. The support structure according to claim 5, wherein a variation in the area of the cross-section of one of the plurality of pillars is achieved by variations of the first dimension simultaneously in the first direction and in a direction opposite to the first direction and variations of the second dimension simultaneously in the second direction and in a direction opposite to the second direction.

7. The support structure according to claim 3, wherein the variation trend of the pillar density in one direction in the printing plane is one or a combination of several of following manners: decreasing first and then increasing and then decreasing; increasing first and then decreasing and then increasing; increasing first and then decreasing; and decreasing first and then increasing.

8. The support structure according to claim 1, wherein a variation trend of the area of the cross-section of the connecting edge of the grid unit in the direction perpendicular to the printing plane is one or a combination of several of following manners: decreasing first and then increasing and then decreasing; increasing first and then decreasing and then increasing; increasing first and then decreasing; and decreasing first and then increasing.

9. The support structure according to claim 1, wherein the hardness of the first material is greater than the hardness of the second material.

10. A printing method of a support structure for printing the support structure according to claim 1, wherein the printing method comprises:
   step S1: in a same slice layer, according to support structure layer printing data, printing and forming a layer solid portion using a first material, and printing and forming a layer non-solid portion using a second material; and
   step S2: repeating the step S1, printing a plurality of layer solid portions and a plurality of layer non-solid portions, the plurality of layer solid portions forming a solid portion of the support structure, and the plurality of layer non-solid portions forming a non-solid portion of the support structure;
   wherein a hardness of the first material is different from a hardness of the second material; the solid portion comprises a grid structure, and both inside and outside of each grid unit of the grid structure are filled with the non-solid portion;
   a grid density of the grid structure varies within a printing plane,
   and/or
   an area of a cross-section of a connecting edge of the grid unit varies in a direction perpendicular to the printing plane;
   wherein the solid portion comprises a plurality of grid layers parallel with the printing plane, and the plurality of grid layers contains the grid structure; the solid portion further comprises a plurality of pillars, each of the plurality of pillars penetrates at least two adjacent layers of the plurality of grid layers, and both inside and outside of space enclosed by the plurality of pillars and the plurality of grid layers are filled with the non-solid portion.

11. The printing method according to claim 10, further comprising, prior to the step S1:
   step S0: converting support structure region data into the support structure layer printing data.

12. The printing method according to claim 11, wherein the support structure layer printing data comprises layer solid data for printing the layer solid portion and layer non-solid data for printing the layer non-solid portion; said printing and forming the layer solid portion using the first material and printing and forming the layer non-solid portion using the second material according to the support structure layer printing data comprises:
   printing and forming the layer solid portion using the first material according to the layer solid data; printing and forming the layer non-solid portion using the second material according to the layer non-solid data.

13. The printing method according to claim 10, wherein the hardness of the first material is greater than the hardness of the second material.

14. A printing system for printing the support structure according to claim 1, wherein the printing system comprises:
   a print head configured to print a layer solid portion using a first material and print a layer non-solid portion using a second material according to support structure layer printing data in a same slice layer, and configured to print a plurality of layer solid portions and a plurality of layer non-solid portions in such a manner that the plurality of layer solid portions forms a solid portion of the support structure and the plurality of layer non-solid portions forms a non-solid portion of the support structure;
   wherein a hardness of the first material is different from a hardness of the second material; the solid portion comprises a grid structure, and both inside and outside of each grid unit of the grid structure are filled with the non-solid portion;
   a grid density of the grid structure varies within a printing plane,
   and/or
   an area of a cross-section of a connecting edge of the grid unit varies in a direction perpendicular to the printing plane;
   a controller configured to control the print head to perform a printing operation;
   the print head is connected to the controller.

15. The printing system according to claim 14, wherein the solid portion comprises a plurality of grid layers parallel with the printing plane, and the plurality of grid layers contain the grid structure; the solid portion further comprises a plurality of pillars, each of the plurality of pillars penetrates at least two adjacent layers of the plurality of grid layers, and both inside and outside of space enclosed by the plurality of pillars and the plurality of grid layers are filled with the non-solid portion.

16. The printing system according to claim 12, further comprising a data processor configured to convert support structure region data into the support structure layer printing data, and the data processor is connected to the controller.

17. The printing system according to claim 16, wherein the support structure layer printing data comprises layer solid data for printing the layer solid portion and layer non-solid data for printing the layer non-solid portion.

18. The printing system according to claim 14, wherein the hardness of the first material is greater than the hardness of the second material.

* * * * *